United States Patent
Liou et al.

(10) Patent No.: US 9,211,677 B2
(45) Date of Patent: Dec. 15, 2015

(54) INKJET PRINTING METHOD FOR FORMING A CONTINUOUS THREE-DIMENSIONAL STRUCTURE

(71) Applicant: NATIONAL TSING HUA UNIVERSITY, Hsinchu (TW)

(72) Inventors: Tong-Min Liou, Hsinchu (TW); Chien-Chong Hong, Hsinchu County (TW); Guo-Shin Lu, Taoyuan County (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 327 days.

(21) Appl. No.: 13/845,132

(22) Filed: Mar. 18, 2013

(65) Prior Publication Data
US 2014/0117584 A1    May 1, 2014

(30) Foreign Application Priority Data
Oct. 26, 2012    (TW) .............................. 101139848 A (51) Int. Cl.
*B29C 67/00*    (2006.01)

(52) U.S. Cl.
CPC .......... *B29C 67/0092* (2013.01); *B29C 67/0059* (2013.01)

(58) Field of Classification Search
CPC ................................................. B29C 67/0059
See application file for complete search history.

(56) References Cited

U.S. PATENT DOCUMENTS

| | | | |
|---|---|---|---|
| 8,137,873 B2 | 3/2012 | Kim et al. | |
| 2005/0023719 A1* | 2/2005 | Nielsen et al. | 264/162 |
| 2006/0035034 A1* | 2/2006 | Matsumoto et al. | 427/487 |
| 2010/0103548 A1* | 4/2010 | Kim et al. | 359/885 |

OTHER PUBLICATIONS

Guo-Shin Lu, Tong-Miin Liou, Chien-Chong Hong, Po-Chin You, Kai-Lun Lin/ Enhancing Resolution of Black Matrix by Self-Aligning Inkjet-Printed Droplets with Heterostructures for Color Filters/ p. 45 / Apr. 26, 2012.

* cited by examiner

*Primary Examiner* — Ryan Ochylski
(74) *Attorney, Agent, or Firm* — CKC & Partners Co., Ltd.

(57) ABSTRACT

An inkjet printing method for forming a continuous three-dimensional structure is disclosed. A pre-patterned temporary structure is formed on a substrate for defining a filling groove on the substrate. An inkjet printing process is performed for filling the ink droplets into the filling groove. The ink droplets cover the filling groove and contact the surface of the temporary structure and the substrate at the same time. A self-aligned effect is formed by a composition of the gravity of the ink droplets, a surface tension between the ink droplets and the temporary structure, and a surface tension between the ink droplets and the substrate. When the ink droplets are solidified, a standalone continuous three-dimensional structure is formed by removing the temporary structure. The geometry of the continuous three-dimensional structure can be defined by the temporary structure; therefore a small track width of the solidified ink droplets can be obtained.

9 Claims, 10 Drawing Sheets

000000000# INKJET PRINTING METHOD FOR FORMING A CONTINUOUS THREE-DIMENSIONAL STRUCTURE

RELATED APPLICATIONS

The application claims priority to Taiwan Application Serial Number 101139848, filed on Oct. 26, 2012, which is herein incorporated by reference.

BACKGROUND

1. Technical Field

The present invention relates to an inkjet printing method for forming a continuous three-dimensional structure, especially relates to an inkjet printing method for forming a continuous three-dimensional structure by a self-aligned effect.

2. Description of Related Art

Photolithography process is a key step in manufacturing the semiconductor devices. A conventional photolithography process mainly includes: photoresist coating, exposure, and developing. First, a photoresist is deposited on a substrate, and then an exposure process through a pre-patterned mask is performed on the photoresist. Finally, a developing process is performed to remove the unnecessary part of the photoresist, and a patterned photoresist is formed. The conventional photolithography process is complicated and requires expensive materials and equipment, so that leads to a decrease of the manufacturing yield and a waste of cost.

Recently, wide researches are performed on finding simpler processes that can replace the photolithography process, and an inkjet printing process is a rapidly developed technology to replace the complicated photolithography process. A conventional inkjet printing process is used for generating patterns on a substrate. When a pressure generated from the phase transition of an ink droplet or a nozzle is larger than the surface tension of the ink droplet itself, the ink droplets are purged to a substrate and a pattern is formed. In the inkjet printing process, the characteristics of the ink droplet are very important. The parameters of the ink droplet such as inertia, viscosity and surface tension should be taken into consideration. In sum of all, like the photolithography process, the purpose of the inkjet printing process is also to form a pattern on a substrate. Compared to the photolithography process, the inkjet printing process has advantages on simpler process and cheaper equipment, thus a low cost of the manufacturing is obtained, and the manufacturing efficiency is enhanced.

However, there exist disadvantages on the inkjet printing process. First, the uncontrollability of the ink droplets track leads to defects occurred on the formed pattern. Second, the characteristic of omnidirectional flow of the ink droplet leads to constrains on resolution of the formed pattern. The issues above make it difficult on applying the inkjet printing process to a structure with a small track width (e.g. <10 μm) or with complicated network geometry. In most case, the structure is more complicated, thus limit the capability of the inkjet printing process. Furthermore, if apply a nozzle with smaller diameter for reducing the track width, the incompatibility of the ink droplet will occur. This is due to the ink droplet contain nano-particle suspensions, and the probability of nozzle blocking will increase with the decrease of the diameter of the nozzle.

SUMMARY

According to one aspect of the present disclosure, an inkjet printing method for forming a continuous three-dimensional structure is provided. The inkjet printing method includes the following steps. A substrate is provided. A temporary structure is formed on the substrate, wherein the temporary structure has a predetermined pattern for defining a filling groove on the substrate. A plurality of Ink droplets are filled into the filling groove, and the ink droplets cover and contact with a surface of the temporary structure and a surface of the substrate at the same time, wherein a self-aligned effect is formed so that the ink droplets are self-aligned to fulfill the filling groove, wherein the self-aligned effect is a composition of a first surface tension between the droplets and the temporary structure, a second surface tension between the ink droplets and the substrate, and the gravity of the ink droplets. The ink droplets are solidified, and are transformed from liquid state into solid state. The temporary structure is removed, and a solidified ink droplets structure is leaved, so that a continuous three-dimensional structure is formed.

BRIEF DESCRIPTION OF THE DRAWINGS

The disclosure can be more fully understood by reading the following detailed description of the embodiment, with reference made to the accompanying drawings as follows.

DETAILED DESCRIPTION

An inkjet printing method for forming a continuous three-dimensional structure is provided. In the following embodiments, the inkjet printing method is cooperated with a color filter for forming a continuous three-dimensional structure, such as a black matrix.

Figure 1:
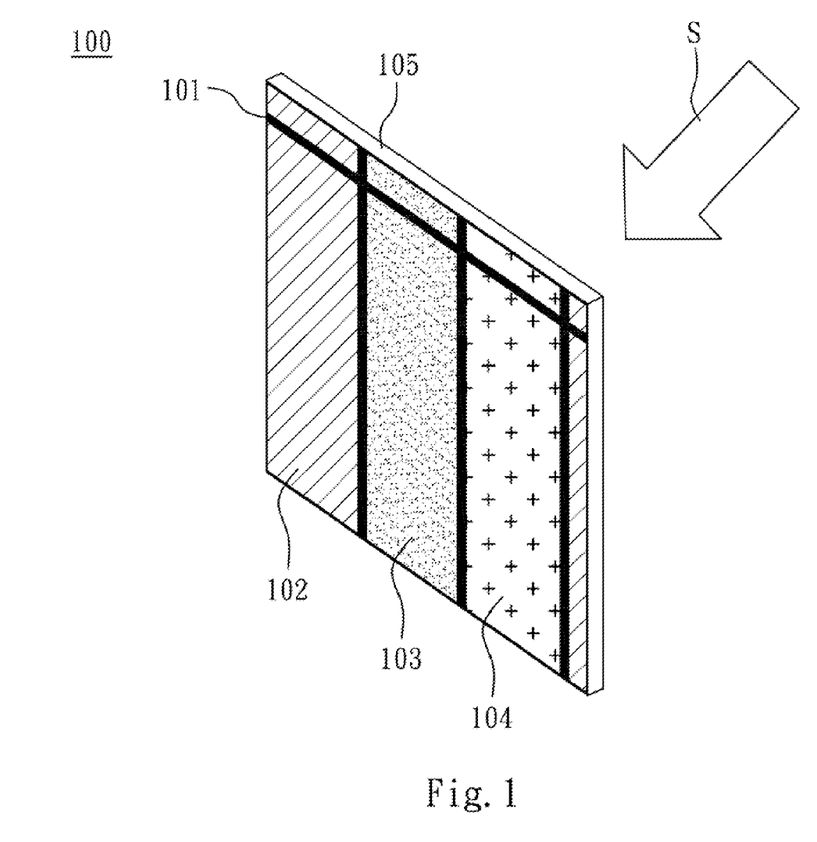
FIG. 1 shows a schematic view of a color filter.

FIG. 1 shows a schematic view of a color filter 100. In FIG. 1, the color filter 100 is a key component of a flat panel display (FPD). The color filter 100 includes a substrate 105, a black matrix 101, red pixels region 102, green pixels region 103, and blue pixels region 104. A monochromatic light source S passes through the color filter 100 and produces a color image which is the compositions of the red pixels region 102, the green pixels region 103, and the blue pixels region 104. The main functions of the black matrix 101 of the color filter 100 are: (a) separating each pixels region; (b) reducing leakage current; (c) blocking stray light; and (d) reducing light reflection so as to increase contrast.

Figure 2A:
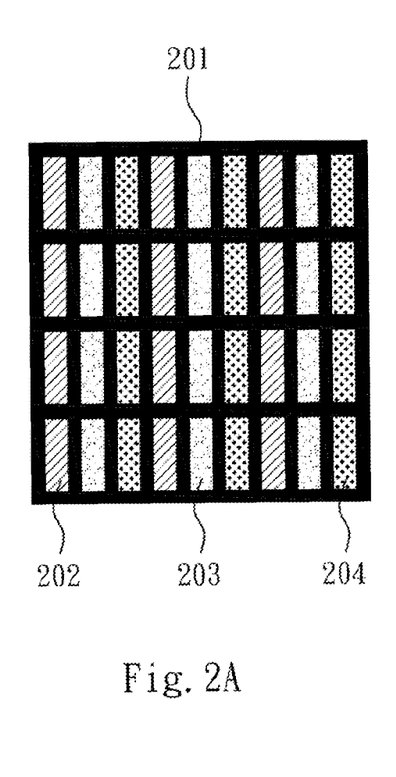
FIG. 2A is a schematic view of a stripe configuration of red pixels region, green pixels region, and blue pixels region in a color filter.
Figure 2B:
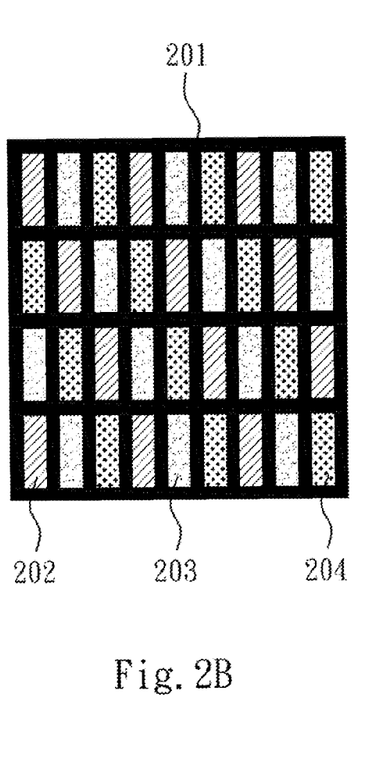
FIG. 2B is a schematic view of a mosaic configuration of red pixels region, green pixels region, and blue pixel's region in a color filter.
Figure 2C:
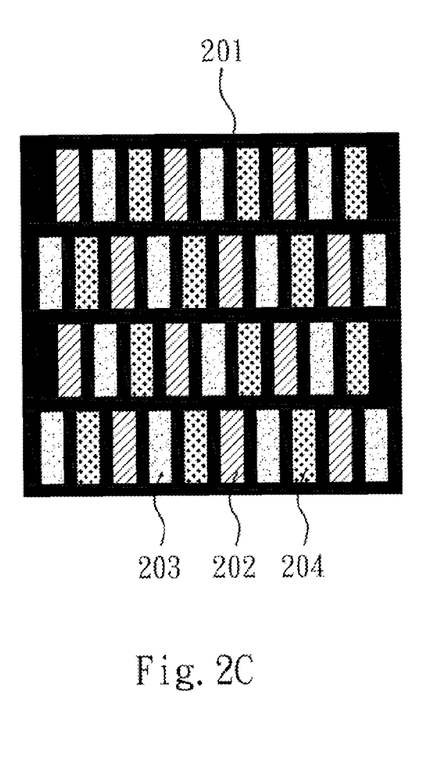
FIG. 2C is a schematic view of a delta configuration of red pixels region, green pixels region, and blue pixel's region in a color filter.

FIG. 2A to FIG. 2C show configurations of the RGB pixels of three color filters respectively. FIG. 2A is a schematic view of a stripe configuration of red pixels region 202, green pixels region 203, and blue pixels region 204 in a color filter; FIG. 2B is a schematic view of a mosaic configuration of red pixels region 202, green pixels region 203, and blue pixels region 204 in another color filter; and FIG. 2C is a schematic view of a delta configuration of red pixels region 202, green pixels region 203, and blue pixels region 204 in yet another color filter. In FIG. 2A to FIG. 2C, each pixel region is separated by a black matrix 201. In FIG. 2C, an offset between each pixel region is formed. The image is produced through the delta configuration of the pixels region having the highest resolution but the most complicated manufacturing process.

Figure 3:
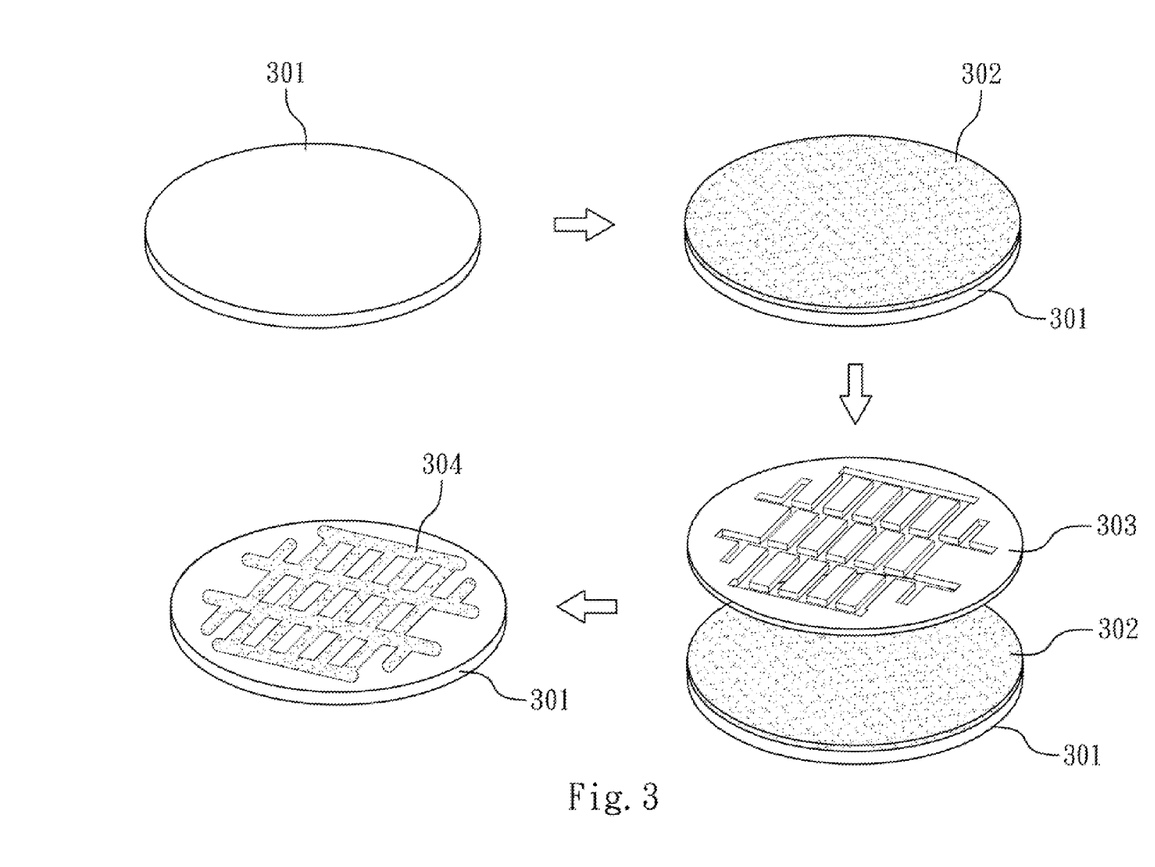
FIG. 3 is a flow chart showing a conventional photolithography process for manufacturing a black matrix.

FIG. 3 is a flowchart showing a conventional photolithography process for manufacturing a black matrix 304. The process includes: (a) A substrate 301 is prepared; (b) A black matrix photoresist 302 is spin-coated on the substrate 301; (c) The black matrix photoresist 302 is pre-baked in an oven at the temperature of 80~100° C. and the baking time of 1~2 minutes. Therefore, the fluidity of the photoresist can be reduced so as to keep the uniformity of the thickness thereof; (d) An exposure process is performed under a UV light with a mask 303 having stripe patterns; (e) The exposed portion of the black matrix photoresist 302 is solidified; (f) A develop process is performed to remove the un-exposed portion of the black matrix photoresist 302, and the black matrix 304 is formed on the substrate 301; and finally (g) The black matrix 304 is post-baked for performing a complete solidification. The process above is very complicated and costly. The exposure equipment is very expensive, and a very complicated optical alignment is required during the exposure process in order to form the pattern of the black matrix 304. Furthermore, the black matrix photoresist 302 is required to be full coated to the substrate 301 initially, but only a few of the black matrix photoresist 302 is leaved during the whole process, thus result in a waste of the materials.

Figure 4:
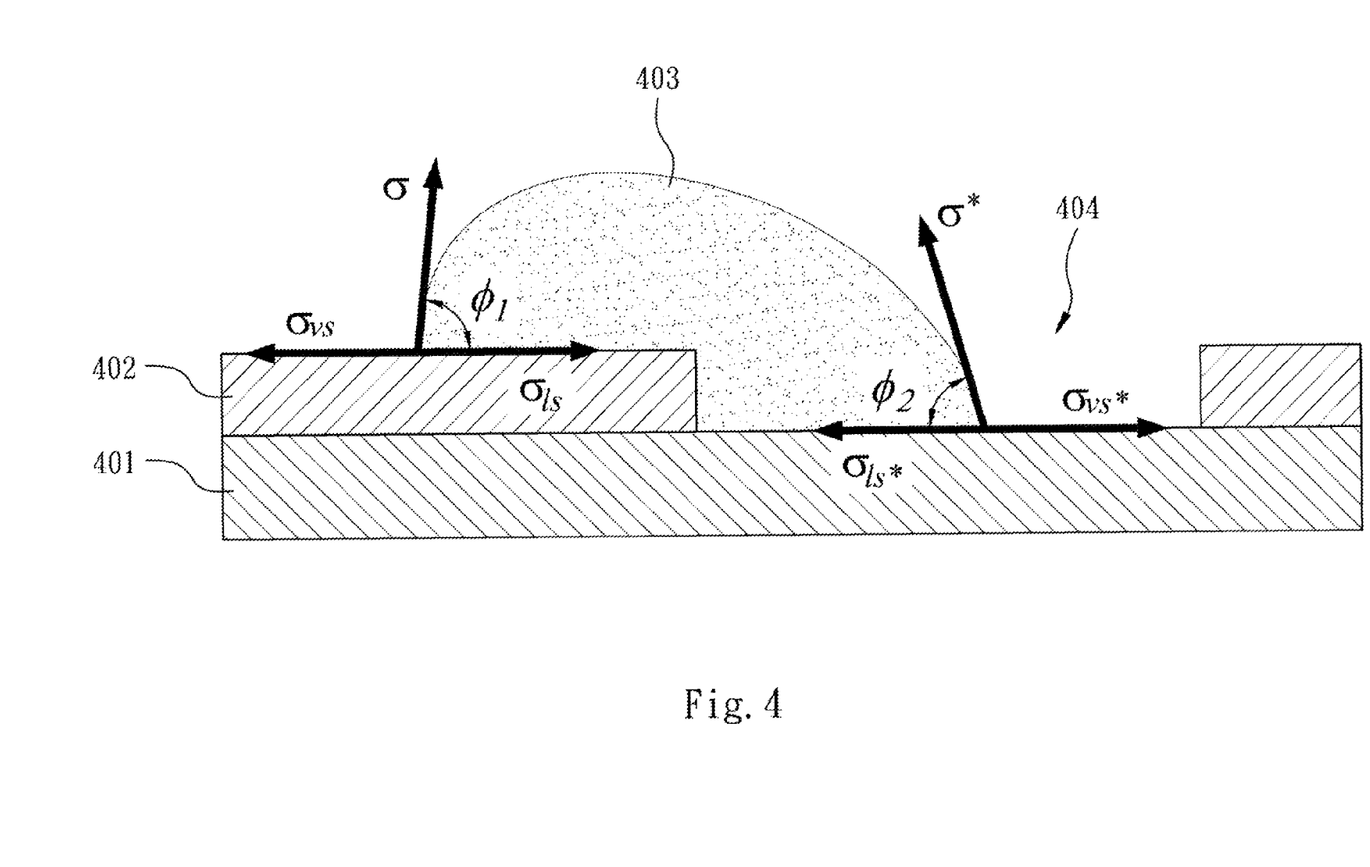
FIG. 4 is a schematic view showing a self-aligned effect of an inkjet printing method for forming a continuous three-dimensional structure according to one embodiment of the present disclosure.

FIG. 4 is a schematic view showing a self-aligned effect of an inkjet printing method for forming a continuous three-dimensional structure according to one embodiment of the present disclosure. The main difference between the conventional inkjet printing process and the present disclosure is the cooperation of the self-aligned effect and a temporary structure. In FIG. 4, the temporary structure 402 is formed on a substrate 401 and a filling groove 404 is formed on the substrate 401. In the embodiment of FIG. 4, the substrate 401 is relatively Hydrophilic, and the temporary structure 402 is relatively Hydrophobic. A plurality of ink droplets 403 are ejected from a printer's nozzle and contact with the surface of the substrate 401 and the surface of the temporary structure 402 at the same time. The flow of the ink droplets 403 satisfies the Young's Equation (1):

$$\sigma_{vs^*} + \sigma_{ls} - \sigma_{ls^*} - \sigma_{vs} = (\sigma_{ls} - \sigma_{vs})\left(1 - \frac{\cos\phi_2}{\cos\phi_1}\right) > 0 \quad (1)$$

Wherein, $\sigma_{vs}$ is a surface tension between the atmospheree and the temporary structure 402;

$\sigma_{ls}$ is a surface tension between the ink droplets 403 and the temporary structure 402;

$\sigma_{vs^*}$ is a surface tension between the atmosphere and the substrate 401;

$\sigma_{ls^*}$ is a surface tension between the ink droplets 403 and the substrate 401; and $\phi_1$ and $\phi_2$ are two contact angles, which are corresponded to a surface tension $\sigma$ between the atmosphere and the ink droplets 403 on the temporary structure 402 and a surface tension $\sigma^*$ between the atmosphere and the ink droplets 403 on the substrate 401.

From above equation, if $\phi_1 > \phi_2$, the ink droplets 403 will flow to the substrate 401. Consider the gravity of the ink droplet 403, the relatively hydrophilic of the substrate 401, and the relatively hydrophobic of the temporary structure 402; the ink droplets 403 will flow to the filling groove 404 continuously. Therefore, the ink droplets 403 will be self-aligned to fulfill the filling groove 404. After solidification, a black matrix of a color filter is formed. The solidified ink droplets 403 can be referred to the structure of the black matrix, and the width of the filling groove 404 can be referred to the track width of the black matrix. Furthermore, different patterns can be applied to the temporary structure 402 in order to form different geometry of the filling groove 404. Thus, the geometry of the black matrix can be defined by the solidified ink droplets 403 that the geometry of the solidified ink droplets 403 is defined by the geometry of the filling groove 404. Therefore, the present disclosure provides a method which is a combination of the self-aligned effect and the inkjet printing process with high material usage rate. In the present disclosure, a black matrix with narrow track width and complicated geometry is demonstrated by applying the inkjet printing process and the self-aligned effect, which can overcome the track width limitation of the conventional inkjet printing process, and reduce the quantity of the material usage.

Figure 5:
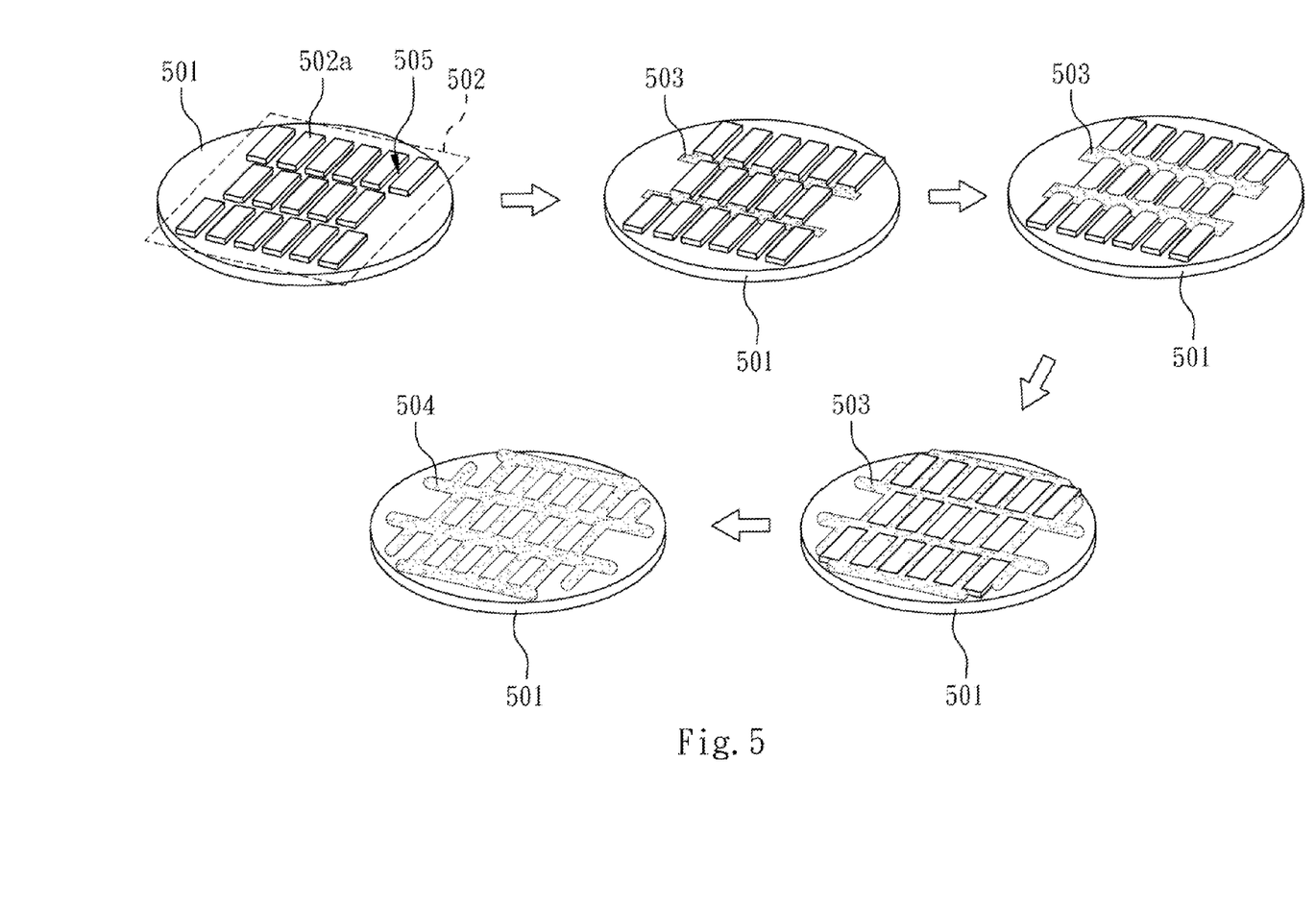
FIG. 5 is a flow chart showing an inkjet printing method for forming a continuous three-dimensional structure of the present disclosure according to another embodiment of the present disclosure.

FIG. 5 is a flow chart showing an inkjet printing method for forming a continuous three-dimensional structure according to another embodiment of the present disclosure. In the embodiment, a black matrix 504 is produced by the method according to the present disclosure. A substrate 501 is chosen as a PES (Polyethersuifone) substrate with a high transmittance as 89% and 200 μm thickness for comparing with the real commercial product. The material of a temporary structure 502 is an AZ-4680 series photoresist. The material of Ink droplets 503 that will form a black matrix 504 is a SU8-2002 series photoresist. PES substrate 501 is relatively hydrophilic, and the temporary structure 502 is relatively hydrophobic. The term "relative" means that the substrate 501 has more hydrophilic characteristic than the temporary structure 502, or the temporary structure 502 has more hydrophobic characteristic than the substrate 501. It is known that the substrate 501 or the temporary structure 502 is not "exact" hydrophilic or hydrophobic. The manufacturing process of the black matrix 504 is as follows. First, the temporary structure 502 is formed on the substrate 501. The temporary structure 502 can be formed by photolithography, screen printing, or imprinting. The temporary structure 502 is chosen as the structure of rectangle bumps 502a, and the configuration of the rectangle bumps 502a are chosen as the configuration of the black matrix 201 in FIG. 2C. The reason of choosing FIG. 2C is the configuration of FIG. 2C can't be formed by the conventional inkjet printing process. After the temporary structure 502 is formed, the SU8-2002 series photoresists as the ink droplets 503 are ejected to a filling groove 505 formed on the substrate

501, and the ink droplets 503 cover and contact with the surface of the substrate 501 and the temporary structure 502. Then, the ink droplets 503 will automatically fulfill the filling groove 505 according to the gravity and the self-aligned effect described in FIG. 4. After the filling groove 505 is full filled with the ink droplets 503, a solidification process is performed to the ink droplets 503, and then the temporary 502 is removed. Finally, the black matrix 504 is formed.

Compared with the conventional photolithography process in FIG. 3, the new method introduced in this disclosure doesn't need to fulfill the black matrix resist 303, thus can reduce the waste of the material. Furthermore, the track width of the black matrix 504 can be adjusted by the width of the filling groove 505. For example, if the width of the filling groove 505 is as narrow as 10 µm, the track width of the black matrix 504 is also 10 µm. A track width narrower than 10 µm is possible achieved using the method in this disclosure; this can't be reached by the conventional inkjet printing process.

Figure 6A:
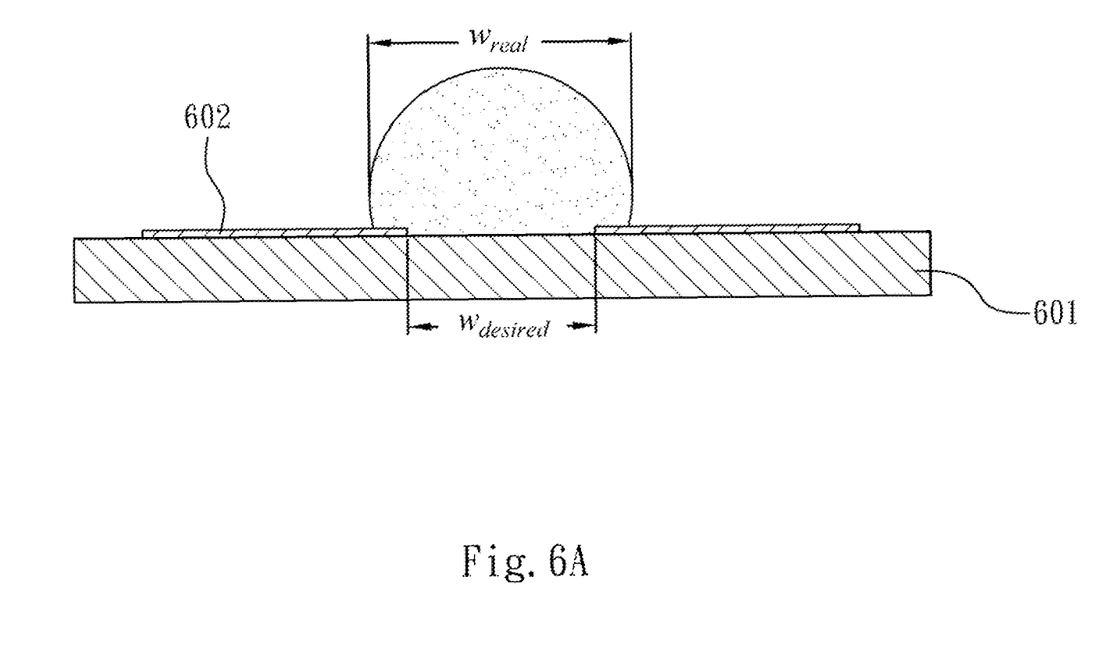
FIG. 6A shows the geometry of an ink droplet under a large volume condition of the conventional inkjet printing process.
Figure 6B:
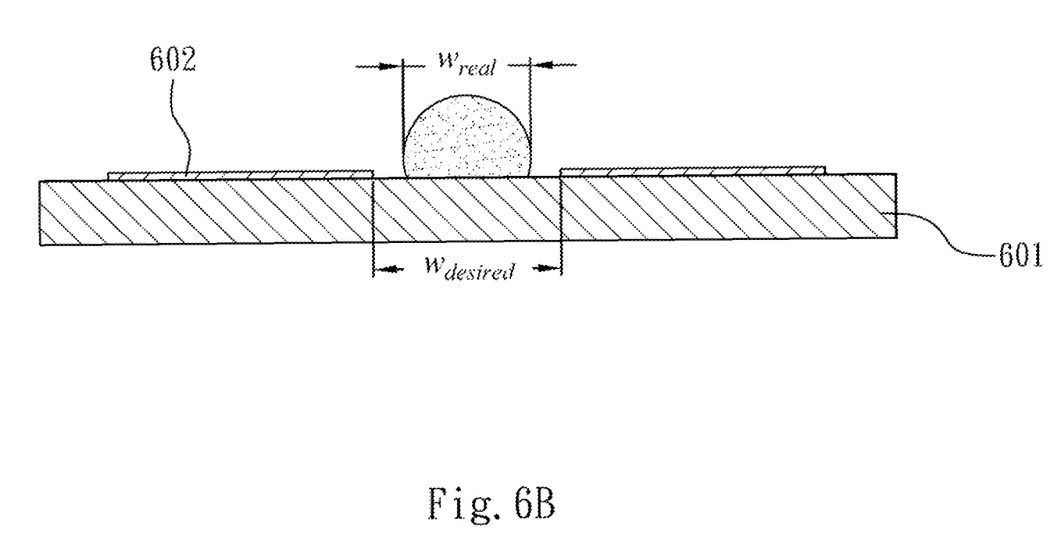
FIG. 6B shows the geometry of an ink droplet under a small volume condition of the conventional inkjet printing process.

FIG. 6A shows the geometry of an ink droplet 603 under large volume condition of the conventional inkjet printing process, and FIG. 6B shows the geometry of an ink droplet 603 under small volume condition of the conventional inkjet printing process. The main issue of the conventional inkjet printing process is it difficult to reduce the track width. For reducing the track width, a pre-treated procedure will be performed on the substrate 601 for changing the characteristic of the surface of the substrate 601. In FIG. 6A, portion of the surface 602 is treated by the plasma and a chemical functional group with nano-scaled size is formed. However, this method has the limitation on reducing the track width, and the side wall of the droplet 603 is curved owing to the nature property of the surface tension between the ink droplet 603 and the substrate 601. Furthermore, although the ink droplet 603 in FIG. 6A has a large volume and can contact with the substrate 601 and the treated portion of the surface 602, the side wall of the droplet 603 can't be vertical and sharp due to lacking of applying a temporary structure. In FIG. 6B, the ink droplet 603 has a small volume and can't contact with the treated portion of the surface 602. The nature of the surface tension makes the ink droplet 603 in FIG. 6B to form a ball-liked droplet. When the ink droplet 603 in FIG. 6B is continuously filled, a situation in FIG. 6A will be formed. Besides, a real width $w_{real}$ of the ink droplet 603 is larger than a desired width $w_{desired}$, so that increase the un-controllability of the track width.

Figure 7:
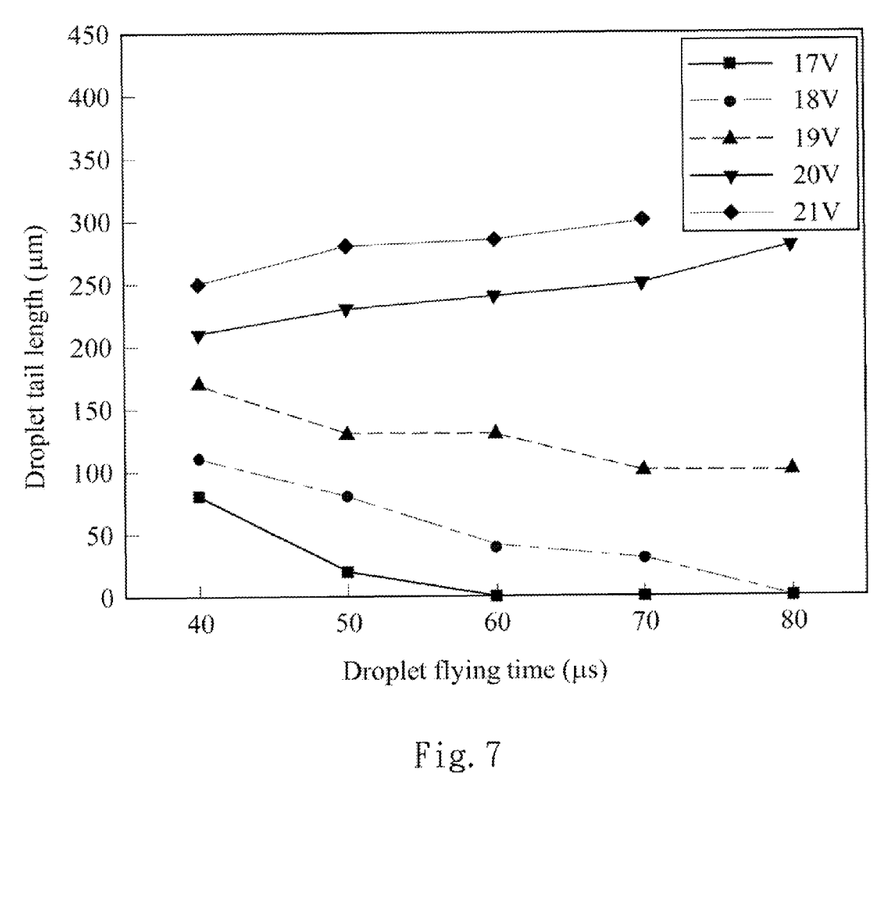
FIG. 7 shows an ink droplet tail length versus flying time during the filling step of the inkjet printing method according to the embodiment of the present disclosure.

FIG. 7 shows an ink droplet tail length versus flying time during the filling step of the inkjet printing method according to the embodiment of the present disclosure. In this embodiment of the present disclosure, the ink droplet is ejected by a piezoelectric nozzle. The principle of the piezoelectric nozzle is to apply a voltage to the nozzle, and the piezoelectric effect will cause the deformation of the nozzle, and the ink droplet is jetted by the nozzle. At a fixed frequency 5 kHz, the voltage applied to the nozzle is proportional to the volume of the ink droplet. It needs to select a proper voltage to form a complete ball of the ink droplet. In FIG. 7, the tail of the ink droplet and the voltage has a critical range. When over the critical range, the too large volume of the ink droplet will cause the broken thereof, and will cause the unnecessary residue of the ink droplet. In the embodiment, the best voltage is 18 volts. When the voltage is larger than 19 volts, the residue of the ink droplet will be produced; and when the voltage is smaller than 17 volts, the insufficient driving force will cause the broken of the ink droplet due to the insufficient supplement of the ink droplet.

Figure 8:
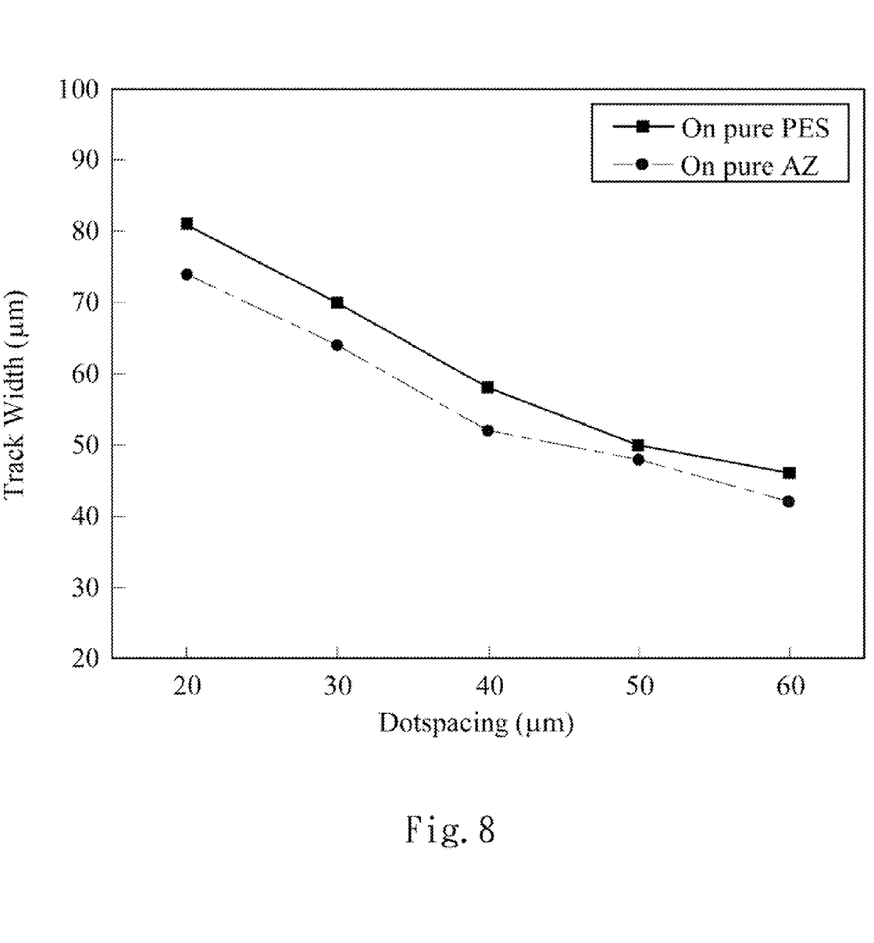
FIG. 8 shows a track width of a solidified ink droplet versus dot spacing according to the embodiment of the present disclosure.

FIG. 8 shows a track width of the solidified ink droplet versus dot spacing according to the embodiment of the present disclosure. To obtain a narrower track width, the self-aligned effect in FIG. 4 should be applied with the optimization of the parameters of the inkjet printing process. From FIG. 8, larger dot spacing is required to form a narrower track width. However, too large dot spacing will cause the discontinuity of the ink droplet, and cause the ink droplet broken.

Figure 9:
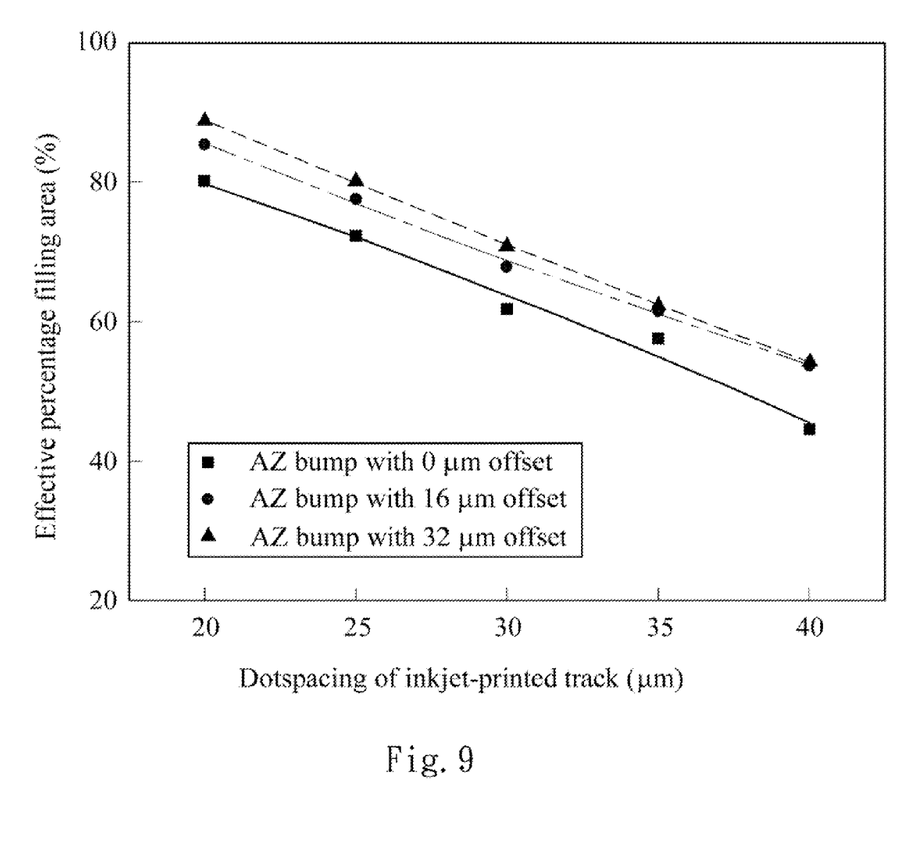
FIG. 9 shows effective percentage filling area versus dot spacing according to the embodiment of the present disclosure.

FIG. 9 shows effective percentage filling area versus dot spacing according to the embodiment of the present disclosure. One of the embodiments of the present disclosure demonstrates a production of the black matrix with a delta configuration as in FIG. 2C. There exists an offset between each pixel in the delta configuration. The effective percentage filling area is defined as: real filling area of the ink droplet/ideal filling area of the ink droplet. In FIG. 9, when using SU8-2002 as the material of the ink droplet, the effective percentage filling area decreases with the increase of the dot spacing, this is due to the decrease of the total volume of the ink droplet. Besides, the effective percentage filling area decreases with the increase of the offset between each pixel. In the embodiment, when the effective percentage filling area is larger than 50%, a continuous three dimensional structure is formed, and the corresponded dot spacing is between 20 µm and 40 µm. This result is corresponded to FIG. 8.

In the foregoing statement, the inkjet printing method for forming the continuous three-dimensional structure is applicable on many products, such as a black matrix of a high resolution color filter (~300 dpi), a fibrin scaffold, a photo transistor array, or flexible solar cell electrodes. It should be mentioned that a micro electrode is successfully formed by the inkjet printing method of the disclosure. After removing the temporary structure, a clear and sharp three dimensional micro electrode is formed, and no ink residue is observed. Therefore, the inkjet printing method involving heterostructures between the substrate and the temporary structure of the disclosure can solve ink residue issue that can't be solved by the conventional micro process.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An inkjet printing method for forming a continuous three-dimensional structure, the inkjet printing method comprising:
   providing a substrate;
   forming a temporary structure on the substrate, wherein the temporary structure has a predetermined pattern for defining a filling groove on the substrate;
   performing a filling step for filling a plurality of ink droplets into the filling groove, wherein the ink droplets cover and contact with a surface of the temporary structure and a surface of the substrate at the same time, and a self-aligned effect is formed so that the ink droplets are self-aligned to fulfill the filling groove, wherein the self-aligned effect is a composition of a first surface tension between the ink droplets and the temporary structure, a second surface tension between the ink droplets and the substrate, and a gravity of the ink droplets;
   solidifying the ink droplets for transforming the ink droplets from liquid state into a solidified ink droplets structure; and removing the temporary structure, and leaving the solidified ink droplets structure, so that a continuous three-dimensional structure is formed;

wherein a first contact angle and a second contact angle are produced under the self-aligned effect, the first contact angle is corresponded to a third surface tension on the temporary structure, and the second contact angle is corresponded to a fourth surface tension on the substrate, so that the ink droplets flow to the filling groove continuously.

2. The inkjet printing method for forming a continuous three-dimensional structure of claim 1, wherein the substrate is relatively hydrophilic, and the temporary structure is relatively hydrophobic.

3. The inkjet printing method for forming a continuous three-dimensional structure of claim 1, wherein a thickness of the solidified ink droplets structure from 0.1 μm to 50 μm.

4. The inkjet printing method for forming a continuous three-dimensional structure of claim 1, wherein a width of the solidified ink droplets structure is from 0.1 μm to 50 μm.

5. The inkjet printing method for forming a continuous three-dimensional structure of claim 1, wherein the solidified ink droplets structure is a network arrangement.

6. The inkjet printing method for forming a continuous three-dimensional structure of claim 5, wherein the network arrangement is a parallel arrangement or a cross-over arrangement.

7. The inkjet printing method for forming a continuous three-dimensional structure of claim 1, wherein the filling step is performed by a continuous filling method or an interval filling method.

8. The inkjet printing method for forming a continuous three-dimensional structure f claim 7, wherein a gap between each ink droplet is formed after performing the interval filling method.

9. The inkjet printing method for forming a continuous three-dimensional structure of claim 8, wherein the gap is from 0 μm to 50 μm.

* * * * *